(12) United States Patent
Hahn et al.

(10) Patent No.: US 8,457,424 B2
(45) Date of Patent: Jun. 4, 2013

(54) METHOD FOR TESTING A MOTION VECTOR

(75) Inventors: Marko Hahn, Neubiberg (DE); Peter Rieder, Munich (DE); Christian Tuschen, Munich (DE); Gunter Scheffler, Munich (DE); Markus Schu, Erding (DE)

(73) Assignee: Entropic Communications, Inc., San Diego, CA (US)

( * ) Notice: Subject to any disclaimer, the term of this patent is extended or adjusted under 35 U.S.C. 154(b) by 995 days.

(21) Appl. No.: 12/406,513

(22) Filed: Mar. 18, 2009

(65) Prior Publication Data

US 2009/0238409 A1 Sep. 24, 2009

(30) Foreign Application Priority Data

Mar. 18, 2008 (DE) .......... 10 2008 014 790
May 5, 2008 (DE) .......... 10 2008 022 091

(51) Int. Cl.
*H04N 7/50* (2006.01)
(52) U.S. Cl.
USPC .......... 382/236; 382/232
(58) Field of Classification Search
USPC .......... 382/103, 107, 209, 216, 218, 236; 348/208.6, 208.4, 208.3, 333.01; 340/5.83; 375/240.12
See application file for complete search history.

(56) References Cited

U.S. PATENT DOCUMENTS

| | | | |
|---|---|---|---|
| 4,771,331 A | 9/1988 | Bierling et al. | |
| 4,853,775 A | 8/1989 | Rouvrais et al. | |
| 5,072,293 A | 12/1991 | De Haan et al. | |
| 5,828,423 A | 10/1998 | Serizawa et al. | |
| 6,628,711 B1 * | 9/2003 | Mathew et al. | 375/240.12 |
| 6,782,054 B2 | 8/2004 | Bellers | |
| 7,006,100 B2 | 2/2006 | Phong et al. | |
| 2004/0071215 A1 | 4/2004 | Bellers | |
| 2004/0141554 A1 | 7/2004 | Phong et al. | |

FOREIGN PATENT DOCUMENTS

WO 00/70879 11/2000

OTHER PUBLICATIONS

Hang, Hsueh-Ming, et al.; "Motion Estimation for Video Coding Standards"; Journal of VLSI Signal Processing Systems for Signal Image, and Video Technology; Spring, New York, NY, US; BD. 17; No. 2/03; Jan. 1, 1997; pp. 113-136; XP000724575; ISSN:0922-5773.

(Continued)

*Primary Examiner* — Anh Do
(74) *Attorney, Agent, or Firm* — Bruce Greenhaus; Richard Bachand; Duane Morris LLP

(57) ABSTRACT

A method for testing a motion vector is described, which has: provision of at least one item of motion information assigned to the image sequence; storing a first image section of the first image in a first buffer memory and storing a second image section of the second image in a second intermediate memory, whereby a position of the first image section in the first image and a position of the second image section in the second image have reciprocal offset, which is dependent on the at least one item of motion information; determining a first image block in the first image section and a second image block in a second image section using the motion vector; comparing the contents of the first and of the second image block.

17 Claims, 8 Drawing Sheets

OTHER PUBLICATIONS

Xi, Ying-Lai, et al.; A fast block-matching algorithm based on adaptive search area and its VLSI architecture for H.264/AVC; Signal Processing Image Communication, Elsevir Science Publishers; Amsterdam, NL; BD. 21, Nr. 8; Jan. 9, 2006; pp. 626-646; XP02080509; ISSN:0923-2965.

European Search Report dated Jul. 14, 2009 for Application No. 09155518.5-2218.

English translation of the European Search Report dated Jul. 14, 2009 for Application No. 09155518.5-2218.

Li et al, "Successive Elimination Algorithm for Motion Estimation," IEEE Transactions on Image Processing, vol. 4, No. 1 (Jan. 1995).

Tourapis, et al, "Highly Efficient Predictive Zonal Algorithms for Fast Block-Matching Motion Estimation," IEEE Transactions on Circuits and Systems for Video Technology, vol. 12, No. 10 (Oct. 2002).

German Office Action dated Feb. 2, 2009 issued in corresponding German Application No. 10 2008 014 790.7-53.

* cited by examiner

METHOD FOR TESTING A MOTION VECTOR

The invention relates to a method for testing a motion vector in image processing.

In image processing it is known to estimate motion in sequential images of an image sequence. This motion is represented by a field of motion vectors assigned to two sequential images of the image sequence. A motion vector of this vector field contains information on a spatial shift of the image contents of an image block from a current image to a previous or subsequent image of the image sequence.

Such motion vectors can be used for example in predictive coding methods such as MPEG-2 or H263. Motion vectors can also be used for interpolation of one or more intermediate images which are arranged temporarily between original images of an image sequence. The motion information is used here to display moving objects true to movement in the intermediate images, i.e. to display an object in an intermediate image at a position lying between the positions of the object in the original images.

With so-called predictive or respectively recursive estimation methods it is known to determine a number of possible motion vectors, so-called test vectors, for each image block and to "test" these individual test vectors. In each case first and second image blocks, the position of which is determined by the test vector and which are arranged in sequential images of the image sequence, are compared to one another using a block matching method. The test vector, which delivers the greatest correlation between the investigated image blocks is selected as motion vector in this method, for example. The test vectors of an image block are for example those motion vectors which were ascertained for image blocks which lie temporarily and/or spatially adjacent to the image block in question. Such predictive estimation methods are described for example in U.S. Pat. No. 4,853,775 (Rouvrais), U.S. Pat. No. 5,072,293 (de Haan) or U.S. Pat. No. 6,782,054 B2 (Bellers).

For carrying out such motion estimation it is basically known to save two sequential images for the duration of the motion estimation in one mapped memory. The usual mapped memories capable of storing a whole image however have excessively long access times for executing motion estimation with the required block matching operations in real time. Examples of such memories are DDR (double data rate) RAMs (Random Access Memories), DRAMs (Dynamic RAMs) or SRAMs (Static RAMs). Memories, which would enable a sufficiently short access time with memory capacities required for storing a whole image are either not available or too expensive. For a complete HD image with 1080 lines and 1920 pixels per line around 7.5 MByte data are to be stored, given that 30 bits per pixel for an RGB display are to be saved (in each case 10 bits for Red (R), Green (G) and Blue (B)).

It is therefore known to provide an additional (fast) buffer memory (cache memory) for each of the two images used for the motion estimation and in each case to save only those image sections of the two images in these memories which are found in the images at the same position. The image sections stored in these memories are then available for the motion estimation.

For costing reasons it is preferable on the one hand to make this cache memory as small as possible. On the other hand the size of the cache memories can influence the quality of the motion estimation in this respect to the extent where for example those movements cannot be determined in which the associated test vector "reaches out" beyond the limits of the saved image section. In this case no image block required for testing the vector in the second cache memory is available for an image block or respectively image range stored in the cache memory.

The aim of the present invention is to provide an improved method for testing a motion vector. This task is solved by a method as claimed in claim 1. Configurations and further developments are the subject matter of independent claims.

In an example of an inventive method for testing a motion vector the following are provided: provision of motion information assigned to at least one image sequence; storing a first image section of a first image of the image sequence in a first buffer memory and storing a second image section of a second image of the image sequence in a second intermediate memory, whereby a position of the first image section in the first image and a position of the second image section in the second image have a reciprocal offset which is dependent on the at least one item of motion information; determining a first image block in the first image section and a second image block in a second image section using the motion vector; comparing the contents of the first and second image blocks.

With this method the positions of the first and of the second image section, which are in each case smaller than the first and second images, are offset to one another depending on the motion information determined for the image sequence. This motion information is for example motion information which was determined for images of the image sequence, present in the image sequence before the first and second image. Use is made here of the fact that motion information determined for the past, i.e. for preceding images of the sequence, is also frequently representative for the motion of a currently evaluated image pair having two sequential images. If for example strong motion were ascertained for preceding images, i.e. if long motion vectors were ascertained, it can be assumed that such long motion vectors also occur in the image pair to be tested currently, and are to be tested accordingly. It is ensured by reciprocal offset of the stored image sections allowing for such previously determined motion information that those image blocks required for testing these motion vectors are stored in the first and second buffer memory also in the case of long motion vectors to be tested.

Determining the motion information comprises for example determining a first motion vector field with several motion vectors, assigned to a pixel pair with two sequential images of the image sequence, and determining the motion information depending on at least one motion vector of the motion vector field. For determining the motion information all or at least some of the motion vectors of the first motion vector field for example are filtered, whereby a resulting filter value corresponds to the motion information. This filtering comprises for example developing an average value of all or some motion vectors of the motion vector field. This filtering can also include a minimal value determination, via which the smallest/shortest of all motion vectors or a group of motion vectors of the first motion vector field is determined, or determining a maximal value, through which the biggest/longest of all motion vectors or a group of motion vectors of the first motion vector field is determined. If the vectors are signed, a minimal value filter delivers the longest vector in a negative direction and a maximal value filter delivers the longest vector in a positive direction. In this case offset or respectively offset of the image sections can be determined by means of the sum of the thus determined extreme values. The motion vector to be tested is for example part of a second motion vector field to be tested. The selected offset between the first and the second image section can be the same for all motion vectors to be tested of the second motion vector field—the absolute positions of the stored first and second image sections differ naturally, depending on the position of the motion vector to be tested within the second motion vector field.

In addition, the selected offset between the first and second image section for individual motion vectors to be tested of the second motion vector field can also be different, i.e. for the individual motion vectors to be tested of the second vector field different motion information is used for determining the offset between the first and the second image section. In an example it is provided to ascertain the motion information for a motion vector of the second vector field by means of at least one such motion vector of the first vector field, whereof the position in the first vector field of the position of the motion vector to be tested in the second vector field corresponds to its position adjacent to the position of the second motion vector to be tested. In the process, several motion vectors of the first vector field can be considered in particular, the positions of which are identical or adjacent to the position of the vector to be tested. These few vectors of the first vector field are filtered to get the required motion information for assessing the offset. Suitable examples of the filtering method are the above-mentioned filtering methods.

The motion information considered for determining the offset can also be obtained by motion vectors of several previously determined motion vector fields being filtered, for example using a filter/regulator having a PI performance (PI=proportional integral).

Embodiments of the present invention will now be explained in greater detail hereinbelow by means of figures. Only those characteristics necessary for an understanding of the present invention are illustrated. Identical reference numerals designate identical parts and procedural steps with identical meaning.

Figure 1:
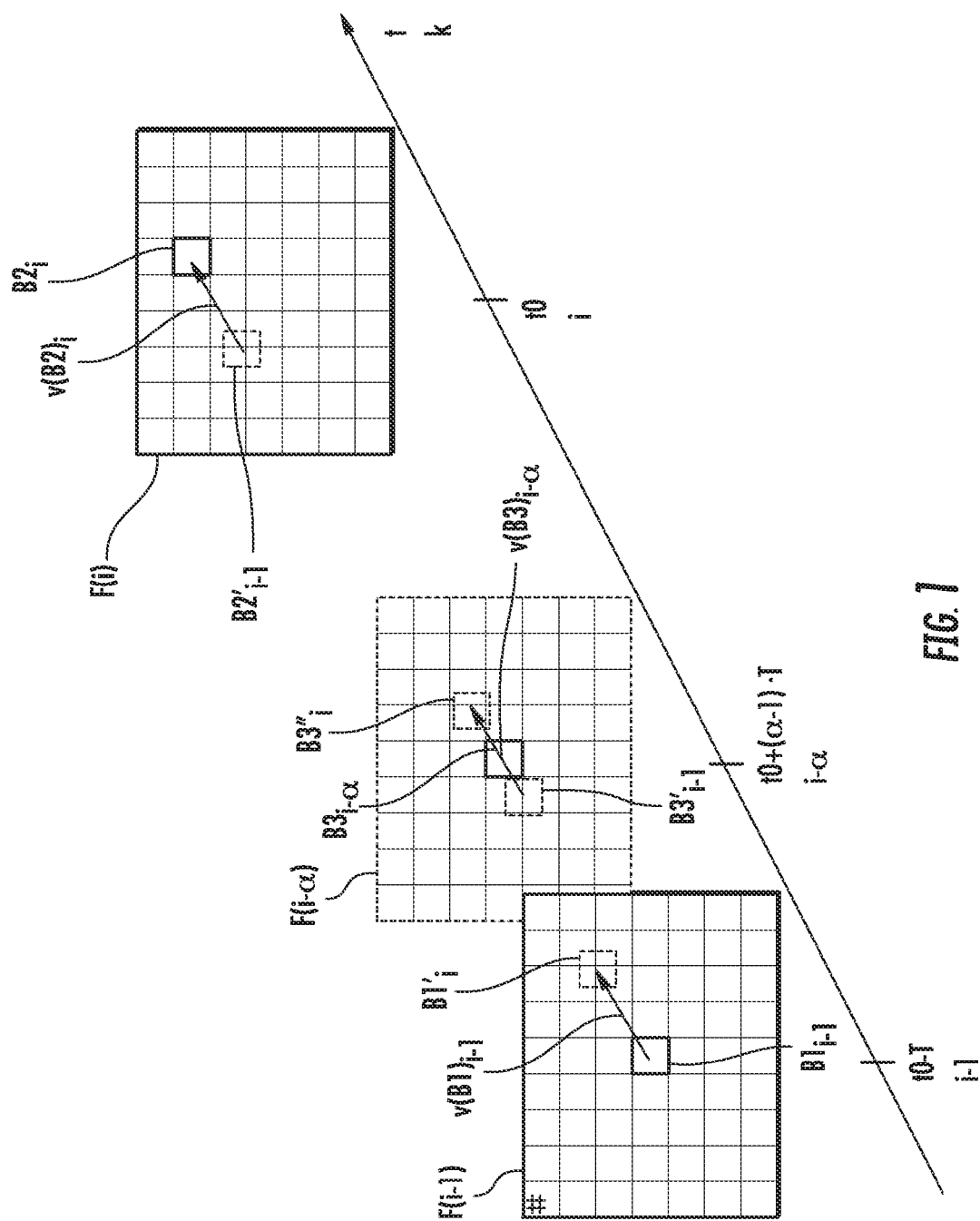
FIG. 1 illustrates a temporal section of an image sequence with several sequential images and illustrates motion vector fields assigned to sequential images of the image sequence.

For better understanding, FIG. 1 schematically shows a temporal section of an image sequence which has several temporarily sequential images. FIG. 1 illustrates a section with two sequential images $F(i-1)$, $F(i)$. k designates a discrete time variable. $i-1$ and $i$ are discrete time points, to which the individual images $F(i-1)$, $F(i)$ are available. An absolute time distance between the two images of the image sequence is for example T. Those absolute time points, to which the images $F(i-1)$, $F(i)$ are available, are designated by t0 and t0-T in FIG. 1, for example. The individual images in each case have a pixel matrix with a number of pixels, as denoted schematically in the left upper reach of the image $F(i-1)$. Assigned to the individual pixels are image information values, such as for example three color intensity values (RGB values) for the primary colors Red, Green and Blue or a luminance value (Y value) and two chrominance values (UV values). The image information values assigned to the individual pixels can change from image to image, enabling mobile imaging.

Motion vector fields are assigned to the images of the image sequence. The individual motion vector fields, which are also designated hereinbelow as vector fields, in each case comprise a number of motion vectors, whereby in FIG. 1 for each of the two images $F(i-1)$, $F(i)$ in each case one motion vector only is illustrated for reasons of clarity, specifically a motion vector $v(B1)_{i-1}$ for an image block $B_{i-1}$ in the first image $F(i-1)$ and a motion vector $v(B2)_i$ for an image block $B2i$ in the second image $F(i)$. Each of these motion vectors represents motion of the image contents of the image block to which it is assigned. The motion vector $v(B1)_{i-1}$ assigned to the image block $B1_{i-1}$ in the first image contains information for example on which position the contents of the image block $B1_{i-1}$ is retrieved in the second image $F(i)$. In the illustrated example this is position $B1_{i-1}$. The motion vector $v(B2)_i$ assigned to the image block $B2_i$ in the second image $F(i)$ contains for example information on which position in the first image $F(i-1)$ the contents of the image block $B2_i$ are retrieved. In the illustrated example this is the position $B2'_{i-1}$.

In the illustrated example image blocks in the individual images are generally designated by Bna, whereby a designates the temporal position of the image, from which the image block originates. The individual image blocks in each case comprise a number of pixels, for example a pixel matrix with 8×8 or 16×16 pixels. The image blocks are arranged in a block grid, for example.

For subsequent explanation it is assumed that there are already image information values present for the individual pixels of the image for the first and second image. These images are therefore denoted subsequently as original images of the image sequence. For different reasons it can be preferable to interpolate one or more intermediate images between two such original images. FIG. 1 for example illustrates such an intermediate image (in dashes), which rests temporarily between the first and second image $F(i-1)$, $F(i)$ and whereof the image content is to be interpolated by means of image contents of the original images, such as for example the image contents of the first and second image $F(i-1)$, $F(i)$. The temporal distance of this intermediate image $F(i-\alpha)$ is $\alpha \cdot T$ from the first image $F(i-1)$ and $(1-\alpha) \cdot T$ from the second image $F(i)$. The temporal position of this intermediate image relative to the first and second image $F(i-1)$, $F(i)$ is denoted as an interpolation phase or motion phase which is determined by the parameter $\alpha$, with $0 \leq \alpha \leq 1$. For the special case $\alpha=0$ the intermediate image corresponds to the first image $F(i-1)$, and for the special case $\alpha=1$ the intermediate image corresponds to the second image $F(i)$.

For the purposes of such interpolation the intermediate image $F(i-\alpha)$ is divided into image blocks, arranged in a block grid. This block grid is illustrated in dashes in FIG. 1 and comprises for example image blocks with 8×8 or 16×16 pixels. In this context it is noted that in FIG. 1 and in the subsequently explained figures only sections of the individual images are illustrated for explanation purposes. Usual video images for example comprise 135×240 image blocks with 8×8 pixels each, i.e. 1080×1920 pixels in all.

For interpolation motion vectors are determined for the individual image blocks of the intermediate image $F(i-\alpha)$. In FIG. 1 $B3_{i-\alpha}$ for example designates such a image block of the intermediate image $F(i-\alpha)$. A motion vector $v(B3)_{i-\alpha}$ determined for such an image block $B3_{i-\alpha}$ of the intermediate image $F(i-\alpha)$ represents motion of the contents of this image block and contains information on which image block in the first image $F(i-1)$ and which image block in the second image F(i) is to be used for interpolation of the image contents of the image block $B3_{i-\alpha}$ of the intermediate image $F(i-\alpha)$. In the illustrated example these are the image blocks $B3'_{i-1}$ and $B3''_i$ in the first and the second image $F(i-1)$, $F(i)$. These image blocks $B3'_{i-1}$ and $B3''_i$ of the original images have the same size as the image block $B3_{i-\alpha}$ to be interpolated, but must not necessarily rest on the block grid, i.e. on grid positions of the block grid. The image contents of both image blocks $B3'_{i-1}$ and $B3''_i$ of the original images determined by means of the motion vector $v(B3)i-\alpha$ can be mixed in any known way in order to interpolate the image content of the image block $B3_{i-\alpha}$ of the intermediate image $F(i-\alpha)$.

When mixed, these image contents are for example weighted depending on the temporal distance between the intermediate image $F(i-\alpha)$ to be interpolated and the original images $F(i)$, $F(i-1)$. Such a procedure is basically known, obviating the need for other configurations.

Reliable motion estimation, i.e. reliable determining of the motion vectors to the individual image blocks of the intermediate image, is essential for correct intermediate image interpolation.

As already explained, the individual motion vectors of a vector field are in each case assigned to blocks of a block grid. These blocks are illustrated in FIG. 1 for the original images $F(i-1)$, $F(i)$ and shown in dotted lines for the intermediate image. For designating a block located at a specific position of the grid the nomenclature (a, b)c is subsequently used, whereby a designates the horizontal position of the block inside the grid s, b designates the vertical position of the image block inside the grid and c designates the position of the image to which the vector field is assigned.

As explained, the individual motion vectors of a vector field are in each case assigned to image blocks of an image. This image can be an original image or an intermediate image to be interpolated between original images of the image sequence. The image content of an image block of such an intermediate image can be interpolated using the motion vector assigned to the image block, in that for example the image contents of the image blocks located in sequential images of the image sequence at the start and end point of the motion vector are mixed. The position of the image blocks to be considered for interpolation in the first and second image $F(i-1)$, $F(i)$ relative to the position of the image block to be interpolated depends on the motion vector. In addition, the position of the image blocks to be considered for interpolation in the first and second image is relative to the position of the image block to be interpolated depending on the interpolation phase, i.e. the temporal position of the image to be interpolated relative to the images of the (original) image sequence. If the image to be interpolated is for example temporarily in the center between two original images then the position of the image block to be interpolated is in a direction preset by the motion vector $v(B3)_{i-\alpha}$ in the center between the image blocks $B1_{i-1}$, $B2_i$ of the first and second image $F(i-1)$, $F(i)$.

Motion information assigned to an image block of an original image can be utilized for example for coding purposes, such as e.g. for MPEG coding.

Figure 2:
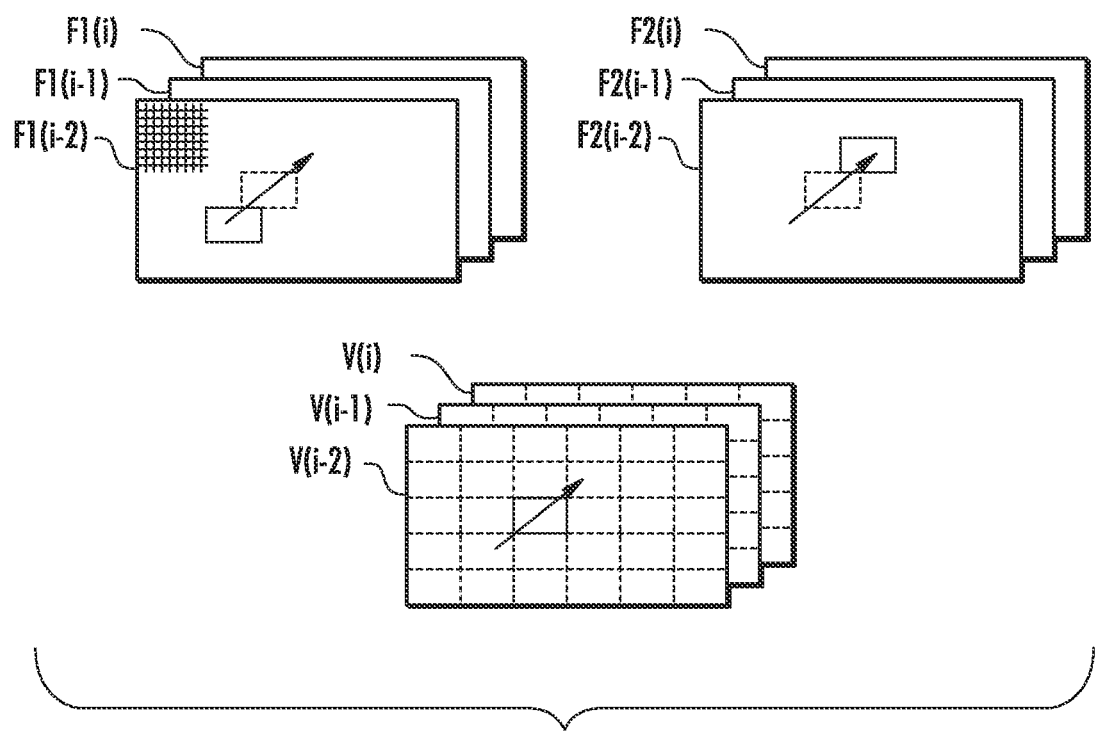
FIG. 2 illustrates a section of an image sequence with temporarily sequential images and spatially adjacent images and illustrates images of motion vector fields assigned to the image sequence.

For the previous explanation it was assumed that a vector field is determined for images which temporarily succeed one another in an image sequence. Such a vector field can of course also be determined for images which are spatially adjacent, which therefore represent different camera positions for example. The vector field can in this case be used to interpolate an image which lies spatially between both the images, therefore representing a synthetic third camera position. With such a method there are at least two part image sequences. A vector field in this case is not ascertained for temporarily sequential images of an image sequence, but at the same time for present images of different part image sequences. This is illustrated in FIG. 2, in which images of a first part image sequence are designated by $F1(i-2)$, ... and images of a second part image sequence are designated by $F2(i-2)$, ... $V(i-2)$, ... in this case respectively designates vector fields which were determined for two images of both image sequences present at the same time. Both part image sequences in this case form an image sequence which comprises both temporarily sequential images and spatially adjacent images.

Subsequent explanation relates to any vector fields, therefore those vector fields which temporarily are assigned to sequential images of an image sequence, or relates to vector fields which are assigned spatially to adjacent images of an image sequence. "Adjacent images" of an image sequence are subsequently understood as either temporarily or spatially adjacent images.

Independently of whether a motion vector field is assigned to an original image or to an intermediate image to be interpolated, determining of the motion vector field requires comparison of the image contents of image blocks in two different original images. Basically any established motion assessment method can be used for determining the individual motion vectors of a motion vector field. A common trait of these methods is that a vector which is an option as a possible motion vector for the vector field is tested. For this, the contents of the image blocks whereof the position in adjacent original images is preset by the motion vector to be tested are compared to one another. An example for such testing of a motion vector is subsequently explained by way of FIG. 3.

Figure 3:
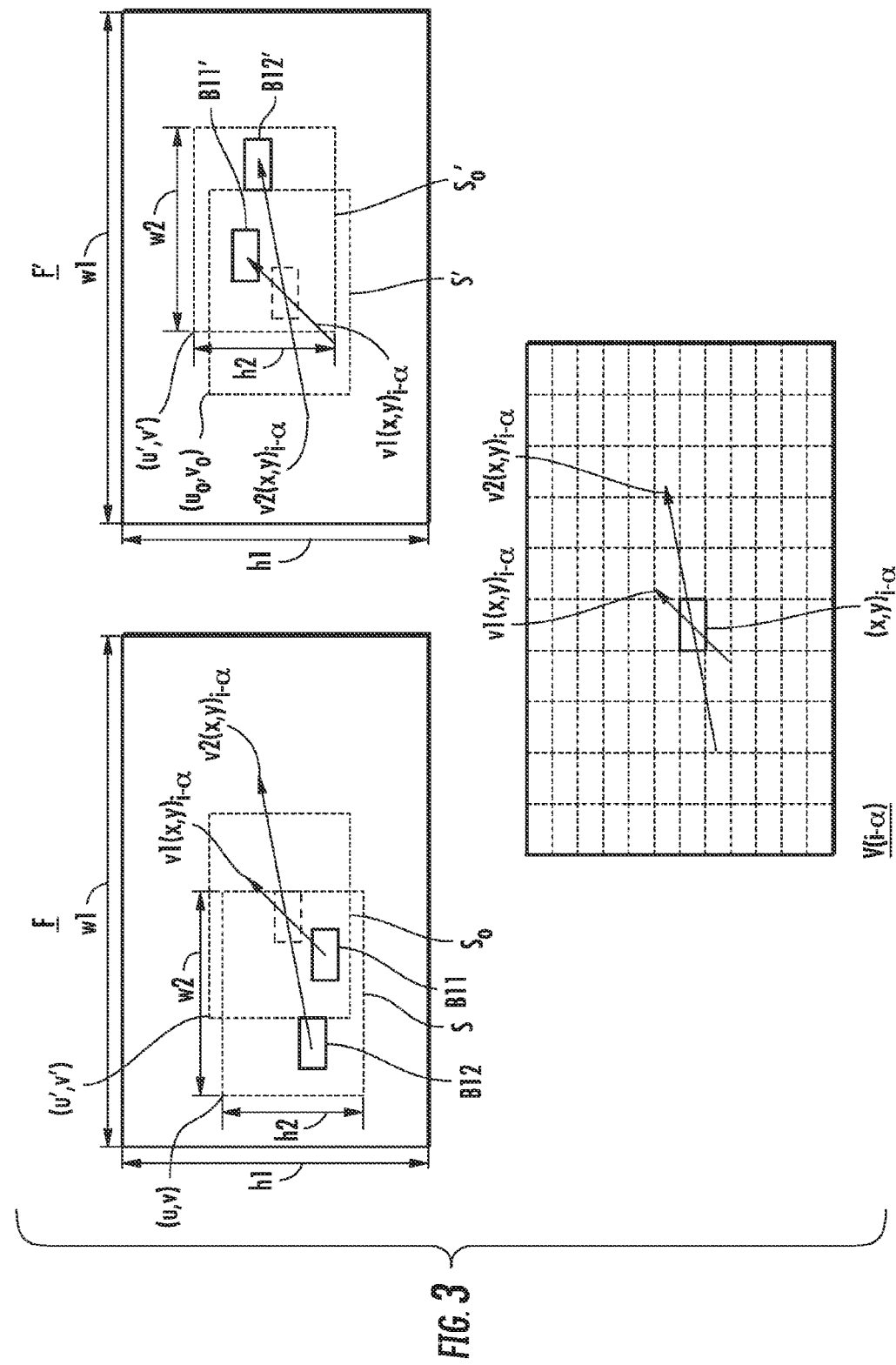
FIG. 3 illustrates procedural steps for testing a motion vector.

FIG. 3 schematically shows two original images F, F' of an image sequence, by means of which a motion vector field $V(i-\alpha)$ is to be ascertained. Both these images F, F' are for example temporarily adjacent images of an image sequence, such as for example the images $F(i-1)$, $F(i)$ according to FIG. 1, or for example are spatially adjacent images of two part image sequences. $(x, y)_{i-\alpha}$ designates a block of an image or respectively block grid looked at in greater detail for subsequent explanation, to which the vector field $V(i-\alpha)$ is assigned. With respect to the previous explanation this image can be an original image, such as e.g. one of the images $F(i-1)$, $F(i)$ in FIG. 1, or an intermediate image, such as e.g. the image $F(i-\alpha)$ according to FIG. 1. Merely for explanation purposes the image illustrated in FIG. 3, to which the vector field is assigned, corresponds to an image located temporarily or spatially between the first and second image F, F'.

It is assumed for explanation that two motion vectors $v1(x, y)_{i-\alpha}$ and $v2(x, y)_{i-\alpha}$ are to be tested that for this block $(x, y)_{i-\alpha}$. The image blocks in the first and second image F, F', the positions of which are predetermined by the first motion vector $v1(x, y)_{i-\alpha}$, are designated by B11 and B11' in FIG. 2, and the image blocks in the first and second image F, F', the positions of which are determined by the second motion vector $v2(x, y)_i$, are designated by B2, B2'. The relative position of these image blocks relative to the block $(x, y)_{i-\alpha}$ of the image, for which both vectors v1 $(x, y)_i$, v2 $(x, y)_i$ are to be tested, is illustrated in FIG. 2 by the position of this block $(x, y)_{i-\alpha}$ being illustrated in dashes in the first and second image F, F'. In this context it is noted that the image blocks, preset by the motion vectors in the first and second image, are not bound to the block grid. The motion vectors can therefore have a "resolution" which is finer than the block grid or respectively which is not bound to the block grid.

For testing a motion vector the image contents of the image blocks in the first and second image F, F' are basically compared to one another, the positions of which are predetermined by the respective motion vector. Comparison of the contents image blocks B11, B11' and for testing the second motion vector $v2(x, y)_{i-\alpha}$ comparison of the contents image blocks B12, B12' is required for testing the first motion vector $v1(x, y)_{i-\alpha}$ for example. Such a comparison can be adequate for example by the image blocks to be compared being compared to one another on a pixel basis. Such comparison comprises for example determining the sum of the absolute values of the pixel differences (SAD, Sum of Absolute Differences).

In the process, differences of the image information assigned to the pixel values are ascertained for pixels which are located in both image blocks at respectively the same positions, and the amounts or whole-number powers of the thus determined differences are added up. The resulting value forms a variable for the correlation between the image blocks. The correlation between the image blocks, and thus the quality of a motion vector to be tested, is all the higher the less the value thus determined, which is also designated as a distance dimension. Methods for determining a distance dimension between image blocks and methods for using such a distance dimension for selecting one of several motion vectors to be tested, also designated as test vectors, are sufficiently well known such that further configurations can be dispensed with here.

For testing a motion vector in reference to the preceding configuration access is required to image information values of pixels of those image blocks the positions of which in the first and second image F, F' are predetermined by the motion vector to be tested. For motion estimation, and thus the related computer operations for testing motion vectors in real time to be conducted, mapped memories with short access times are required. Mapped memories, which are capable of storing a whole image, and which are therefore capable of storing the image information values for all pixels of an image, either have excessively long access times to enable such testing of motion vectors in real time, or are too expensive and thus too uneconomical for the nominated application.

It is therefore provided, for testing a motion vector to save image sections of both adjacent images F, F' in intermediate memories which have correspondingly short access times. The image sections stored in the intermediate memories are smaller than the first and second images F, F'. The images F, F' have for example a width of w1 pixels and a height of h1 pixels, while the image sections have a width of w2 pixels and a height of h2 pixels, whereby w2 is <w1 and/or h2 is <h1. A first image section of the first image F is designated by S in FIG. 2 and a second image section of the image F' is designated by S'; these are saved for testing a motion vector in a first and a second buffer memory. The position of these image sections within the first and second images F, F' basically depends on the position of the block $(x, y)_{i-\alpha}$ inside the block grid. The first image section S and the second image section S' are in addition offset to one another, that is, a position of the first image section S inside the first image F differs from a position of the second image section S' inside the second image F'. For subsequent explanation it is assumed that the position of the image sections S, S' within the first and second images F, F' is defined by the position of the left upper corner. The first image section S is located at a first position (u, v), while the second image section S' is at a second position (u', v'). For an offset ($\Delta u, \Delta v$) between these two positions in this case:

$$(\Delta u, \Delta v) = (u, v) - (u', v') \quad (1).$$

This offset comprises two components, a horizontal component $\Delta u$ and a vertical component $\Delta v$.

Provided the offset between both image sections S, S' relative to the motion vectors to be tested is selected correctly, this method can also be employed to test motion vectors which represent rapid movements between both images F, F', which therefore are longer than the dimensions of the image sections saved in the intermediate memories. The second motion vector $v2(x, y)_i$ according to FIG. 2 is such a "long" motion vector which has a horizontal component in the example, which is greater than the width w2 of the image sections. Such a motion vector could not be tested if those image sections situated in the first and second image F, F' at the same position were to be stored in the intermediate memories.

Two such image sections S0, S0', which are found in both images F, F' at the same position (u0, v0), are illustrated in FIG. 2 for comparison. The image blocks B2, B2' represented by the second motion vector $v2(x, y)_{i-\alpha}$ in each case lie outside these image sections S0, S0', so that this motion vector cannot be tested using these image sections S0, S0'. If there is however offset between the positions of the stored image sections S, S', which is selected such that the image blocks B1, B2 assigned to the motion vector to be tested in the first image S lie inside the first image section S and such that the image blocks B1', B2' assigned to the motion vector to be tested inside the second image F' lie inside the second image section S', then long motion vectors can also be tested without bigger and thus more cost-intensive buffer memory being required.

The offset ($\Delta u, \Delta v$) depends on motion information determined previously for the image sequence, which comprises the first and second images, F, F'. This motion information for example depends on motion vectors of a motion vector field already determined previously for images of the image sequence. V(i−m) generally designates in subsequent explanation a vector field which was determined for a temporarily preceding original image of the image sequence or for a temporarily preceding intermediate image of the image sequence.

For the offset between the image sections during testing a motion vector of a current vector field V(i) is generally:

$$(\Delta u, \Delta v) = f(V(i - \alpha - m)) \quad (2).$$

This offset ($\Delta u, \Delta v$) is therefore a function of a vector field V(i−α−m) previously determined for the image sequence. In reference to the example according to FIG. 1 this means that an offset for testing motion vectors of the vector field V(i−α) can be calculated as a function of the previously determined motion vector field of V(i−1). In the example according to FIG. 1 the offset for testing a motion vector of the motion vector field V(i−α) of the intermediate image F(i−α) can be determined for example as a function of a motion vector field V(i−1) previously determined for the original image F(i−1).

Also, depending on several previously determined motion vector fields the offset ($\Delta u, \Delta v$) can of course be calculated such that it is generally:

$$(\Delta u, \Delta v) = f(V(i - \alpha - m), \ldots V(i - \alpha - n)) \quad (3).$$

Use is made here of the fact that in many cases there is motion in images of an image sequence available across several images. In using a recursive motion assessment method, wherein the motion vectors to be tested of a current motion vector field are selected for example depending on the motion vectors of a motion vector field previously determined for the image sequence, the motion influences the motion vectors to be tested determined previously for the image sequence. Alternatively, this motion information also influences the offset between the image sections used for testing the motion vectors. If for example previously rapid movements, that is, long motion vectors, were ascertained for the image sequence potentially long motion vectors are to be tested for the current motion vector field. Setting the offset between the image sections needed for the test depending on motion information determined for preceding images enables correct setting of this offset, so that long motions vectors can also be tested.

In an embodiment provision is made for the offset ($\Delta u$, $\Delta v$) to be selected the same for testing the motion vectors of a motion vector field to be tested for all motion vectors. This offset is to be chosen for example depending on the average value of the motion vectors of a previously determined motion vector field. The average value of the motion vectors of a motion vector field is calculated for example by the horizontal components of the individual motion vectors being added up and by the vertical components of the individual motion vectors being added up and by the resulting sums being divided by the number of relevant motion vectors. The outcome is an average motion vector for the previously ascertained motion vector field V(i−m). This average motion vector can be used directly as offset ($\Delta u$, $\Delta v$), whereof the horizontal component can therefore be used as a horizontal component $\Delta u$ of the offset and whereof the vertical component can be used as a vertical component $\Delta v$ of the offset. In this method the same offset is selected for all image ranges for which motion vectors are to be tested, and thus for all motion vectors which are to be tested for an image range.

Instead of developing the average value of a few or of all motion vectors of a previously determined motion vector field the motion vectors of one or more previously determined motion vector fields can undergo any filtering to obtain a filter value which represents the offset used in testing. The offset can for example be adjusted such that it is dependent on the smallest/shortest motion vector of a previously determined motion vector field or that it is dependent on the biggest/ longest motion vector of the previously determined motion vector field.

Instead of selecting the offset the same for all motion vectors of the vector field V(i) to be tested—i.e. for image ranges and for all motion vectors which are to be tested for an image range—there is also the possibility of variably setting this offset for an individual motion vector to be tested. The offset can vary for example from image range to image range; the offset for testing motion vectors assigned to an image range can therefore vary from image range to image range. Depending on motion vectors in one or more previously determined motion vector fields the offset ($\Delta u$, $\Delta v$) is in this case located for example at the same position as the motion vector to be tested within the vector field, or located at adjacent positions as the motion vector to be tested. For a motion vector to be tested at the position $(x, y)_{i-\alpha}$ of the block grid for example those motion vectors in preceding vector fields located in these vector fields at the position (x, y) or at adjacent positions (x−a, y−b) are considered for assessing the offset, whereby for example a and b are whole numbers, for example between −2 and 2.

In addition, the offset for an individual motion vector to be tested of a image range can vary. This is meaningful for example whenever the vectors to be tested for an image range motion differ substantially with respect to their length. In this case, and allowing for their length and/or their reciprocal vectorial difference, the individual test vectors are subdivided into different groups and a different offset is selected for testing the individual groups in each case. "Testing a group" in this context is understood as testing the individual motion vectors of a group. In the simplest case, two groups with test vectors are developed: a first group with shorter test vectors; and a second group with longer test vectors. The offset for the group with the shorter test vectors can be zero in particular.

Various offset values for an image range with a motion vector to be tested, located at the position (x,y), are ascertained for example by motion vectors from preceding vector fields which are located in these vector fields at the position (x, y) or at adjacent positions (x−a, y−b), being evaluated. In this context a and b are whole numbers between −2 and 2 for example. Considering the length of these motion vectors the individual offset values can be determined for example by the individual motion vectors being divided into different groups allowing for their length and by an offset being determined by means of each group, in that the motion vectors of the group undergoes one of the above-mentioned filtering examples, such as e.g. average value formation. The motion vectors are graded into the individual groups for example in such a way that the amount of a difference vector arising from subtracting any two vectors of the group is less than a preset threshold value. The number of individual groups—and thus the number of different offset values—can vary in the process, depending on the extent to which the individual motion vectors employed to ascertain the offset values differ from one another.

A combination of the abovementioned variants is also possible. For example there is the possibility of selecting two or more different offsets and using these different offsets equally on all image ranges. Allowing for their length the motion vectors to be tested are divided into different groups and the motion vectors of a group are tested in each case using one of the different offsets. The different offset values are ascertained in a manner as previously explained, for example by the individual motion vectors of one or more previously explained motion vector fields being graded into different groups and by an offset being determined by filtering the individual motion vectors of this group using each of these groups.

Two different offsets, one of which is zero for example, are selected in a simple variant.

Depending on the position (x, y) of the motion vector to be tested the absolute position of both image sections S, S' in the first and second image F, F' is inside the block grid and also on the offset ($\Delta u$, $\Delta v$) to be considered. If the block grid of the motion vector field represents an intermediate image to be interpolated, the absolute position of the first and second image sections S, S' can also depend on the interpolation phase which is assigned to the motion vector to be tested. For the position (u1, v1) of the first image section S, and for the position (u2, v2) of the second image section S' in this case for example the following applies:

$$(u1) = (u_0 - \alpha \cdot \Delta u, v_0 \alpha \cdot \Delta v) \tag{4a}$$

$$(v2) = (u_0 - (1-\alpha) \cdot \Delta u, v_0 - (1-\alpha) \cdot \Delta v) \tag{4b}$$

$\alpha$ hereby designates the interpolation phase which can accept values between 0 and 1. ($u_0$, $v_0$) designates the position of an image section which is selected such that it comprises the block $(x, y)_i$ of the block grid of the motion vector field. In an example it is provided that the position ($u_0$, $v_0$) of this image section is selected such that the block (x, y) of the block grid lies at least approximately in the center of this image section. This image section corresponds for example to one of the image sections S0, S0' illustrated in FIG. 3, which are located within both images F, F' in each case at the same position.

The position ($u_0$, $v_0$), at which the image sections S0, S0' are located, defines a basic position for both image sections S, S' selected for testing. The positions of these image sections S, S' are shifted relative to this basic position. The shift of both image sections S, S' relative to this basic position ($u_0$, $v_0$) depends on the previously determined offset and depends on the interpolation phase according to the equations (4a) and (4b). If $\alpha=0$ is true for the interpolation phase for example, the position of the first image section S corresponds to the basic position, while the position of the second image section S' is displaced by the offset ($\Delta u$, $\Delta v$) relative to this basic position. If $\alpha=1$ is true for the interpolation phase for example, the position of the second image section S' corresponds to the basic position, while the position of the first image section S' is displaced relative to this basic position by the offset ($\Delta u$, $\Delta v$).

If the previously determined motion is zero, and if therefore the offset between the first and second image sections S, S' equals zero, then the first and second image sections S, S' are at the same position corresponding to the basic position ($u_0$, $v_0$). Depending on the position of the motion vector to be tested this basic position is inside the block grid in a manner as previously explained.

A device for testing a motion vector of a motion vector field using the previously explained procedural steps is subsequently explained by way of FIG. 4, in which a block diagram of such a device is illustrated. The illustrated device has an input for feeding an image signal VS which contains image information on a sequence of temporarily and/or spatially adjacent original images. This image signal VS, for example a video signal, is forwarded directly to a second mapped memory 12 and to a first mapped memory 11 via a delay member 13. A memory capacity of both these mapped memories 11, 12 is selected such that these mapped memories 11, 12 are in each case suitable for storing a whole image of the image sequence, that is, pixel values or image information values on all pixels of this image. For subsequent explanation it is assumed for example that the first image F according to FIG. 3 is saved for testing the motion vectors of a motion vector field in the first mapped memory 11 and the second image F' according to FIG. 3 is saved in the second mapped memory 12.

A first buffer memory 31 is saved in the first mapped memory 11, and a second buffer memory 32 is saved in the second mapped memory 12. Memory capacities of this buffer memory 31, 32 are in each case selected such that this buffer memory can store only an image section of the first and second image F, F'. For further explanation it is assumed for example that pixel values of the first image section S according to FIG. 3 are saved in the first mapped memory 31 and pixel values of the second image section S' according to FIG. 3 are saved in the second buffer memory 32. Read and write circuits 21, 22 are connected in between the mapped memories 11, 12 and the buffer memory 31, 32 for reading off the pixel values of the first and second image sections S, S' from the first and second mapped memory 11, 12 and for writing these pixel values in the first and second buffer memory 31, 32. Via address signals S51, S52 these read and write circuits receive address information which specify at which position within the first and second images F, F' the image sections S, S' to be saved in the intermediate memories 31, 32 are located, and which thus specify which memory sectors of the first and second mapped memory 11, 12 are to be read. The first address signal S51 represents for example the position (u, v) of the left upper corner of the first image section S, while the second address signal S52 represents the position (u', v') of the left upper corner of the second image section S'. Information on the horizontal and vertical dimensions, that is, on the memory sectors to be read of the first and second mapped memory 11, 12 starting out from these positions is saved in the read and write circuits 21, 22.

The first and second buffer memories 31, 32 are connected to a test circuit 40 which is configured to access pixel values saved in the intermediate memories 31, 32. This test circuit 40 has a first motion vector memory 41, in which motion vectors at least of a vector field previously determined for images of the image sequence are saved. "Images of the image sequence" can in this context be original images of the image sequence, but can also be intermediate images to be interpolated, for the interpolation of which a motion vector field is required. At the beginning of the process, at a stage therefore when no motion estimation has yet occurred, initial values, for example zero vectors, are saved in this vector memory 41.

The test circuit 40 also has a test vector unit 42 configured to provide the motion vectors to be tested. The test circuit 40 also comprises a calculation unit, to which the individual test vectors provided by the test vector unit 42 are fed and which reads the pixel values of the image blocks from the first and second buffer memory 31, 32, represented by the motion vector to be tested in the first and second image F, F', and which ascertain the distance dimension of these image blocks. The illustrated testing unit 40 can be part of a unit for motion estimation (not illustrated), which evaluates the distance dimensions determined by the calculation unit 43 and which selects motion vectors of the motion vector field (V(i−α) according to FIG. 3) by means of the distance dimensions determined for individual test vectors. These motion vectors are then written for example into the vector memory 41 and are then available for creating test vectors of a motion vector field to be subsequently ascertained.

It is assumed that a motion vector field is to be determined for an original image or an intermediate image of an image sequence. Those motion vectors already determined for image blocks which are arranged temporarily and/or spatially adjacent to the image block with the given grid position are selected as test vectors for determining a motion vector for an image block at a given grid position of this image, for example. A spatially adjacent image block here is an image block located in the same image but at a spatially adjacent position; a temporarily adjacent image block here is an image block located at the same spatial position but in a temporarily preceding image; and a temporarily and spatially adjacent image block here is an image block located at an adjacent spatial position in a temporarily preceding image. A "temporarily preceding image" in this context is an original image or an already interpolated image.

The motion vectors of a motion vector field can be fed for example to an interpolator 60 which interpolates an intermediate image using these motion vectors and using the pixel values saved in the intermediate memories 31, 32; this image lies spatially and temporarily between the first and second image F, F'. Such a procedure is fundamentally known, obviating the need for any further configurations.

There is an addressing unit 50 for generating the address signals S51, S52, which accesses the vector memory 41 in which motion vectors at least of one previously determined motion vector field are saved. The addressing unit 50 generates the address signals S51, S52 depending on motion information represented by at least some of the motion vectors saved in the vector memory 41. The addressing unit 50 generates the address signals S51, S52 also depending on a base address signal S100. In reference to FIG. 3 for example this base address signal represents the position of an image section which comprises the block grid position (x, y) of the motion vector to be tested. This base address signal is provided for example by a central sequential control 100 which also controls the test procedure via the testing unit 40 and which consequently presets for which position of the motion vector field or respectively for which block grid position a motion vector is to be tested. In reference to FIG. 3 the address information represented by the base address signal S100 for example corresponds to the position ($u_0$, $v_0$) of the image sections S0, S0'. The addressing unit 50 determines the offset between the first and second image sections S, S' and calculates the first and second address signals S51, S52 allowing for this offset from the base address signal S100.

Figure 4:
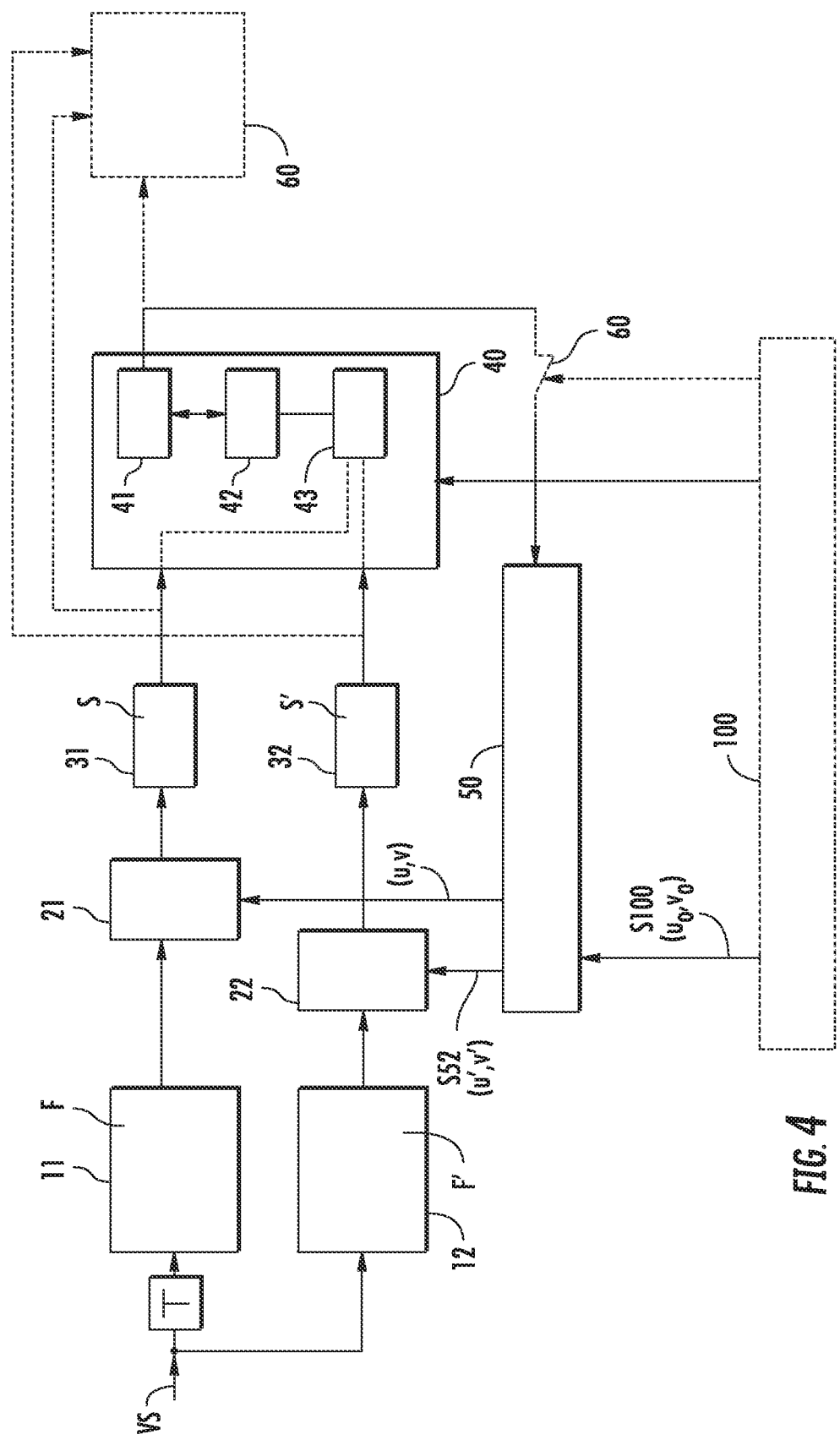
FIG. 4 illustrates an example of a device for testing a motion vector, which has an addressing circuit.
Figure 5:
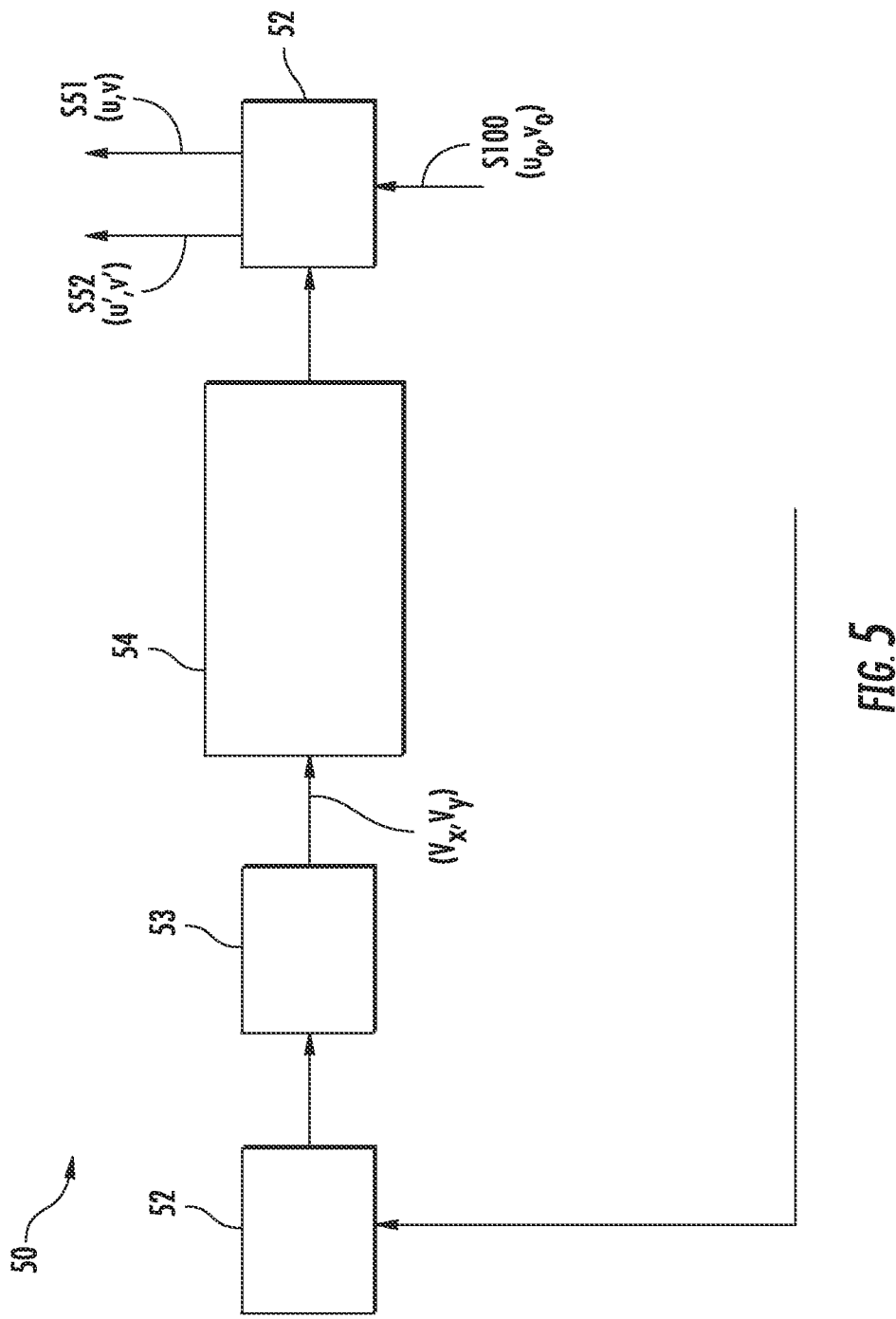
FIG. 5 shows an example of the addressing circuit which has a filter.

An example of the addressing circuit 50 is illustrated in FIG. 5 as a block diagram. This addressing circuit 50 has a selection unit 52 configured to select a group of motion vectors from the vector memory (41 in FIG. 4). This group of motion vectors can include all motion vectors of a motion vector field saved in the vector memory 41, for example whenever the same offset between the first and second image section (S, S' in FIG. 3) is to be set for all vectors of a motion vector field to be tested. This group of motion vectors can however also include just a subgroup of motion vectors of one or more motion vector fields, for example those motion vectors which are in the saved motion vector field at positions identical or adjacent to the position at which the motion vector to be tested is located.

The selection circuit 52 is connected downstream of a first filter 53 which filters the motion vectors selected by the selection circuit 52. This filter 53 is for example an average value filter which forms the average value of the selected motion vectors, a minimal value filter which determines the smallest/shortest of the selected motion vectors, or a maximal value filter which ascertains the biggest/longest of the selected motion vectors. At the output of this first filter 53 motion information is available which comprises a horizontal vx and a vertical vy motion component and contains information on motion, represented by the motion vectors selected by the selection unit 52. This first motion information (vx, vy) is fed to a second filter 54 which has for example a PI filter performance and at the output of which the offset ($\Delta u$, $\Delta v$) is available. This offset ($\Delta u$, $\Delta v$) is fed to an address calculation unit 51 along with the base address signal S100. This calculation unit 51 generates the first and second address signal depending on the offset and the base address signal, and if required depending on the interpolation phase, as was explained for example by way of equations (4a) and (4b).

Figure 6:
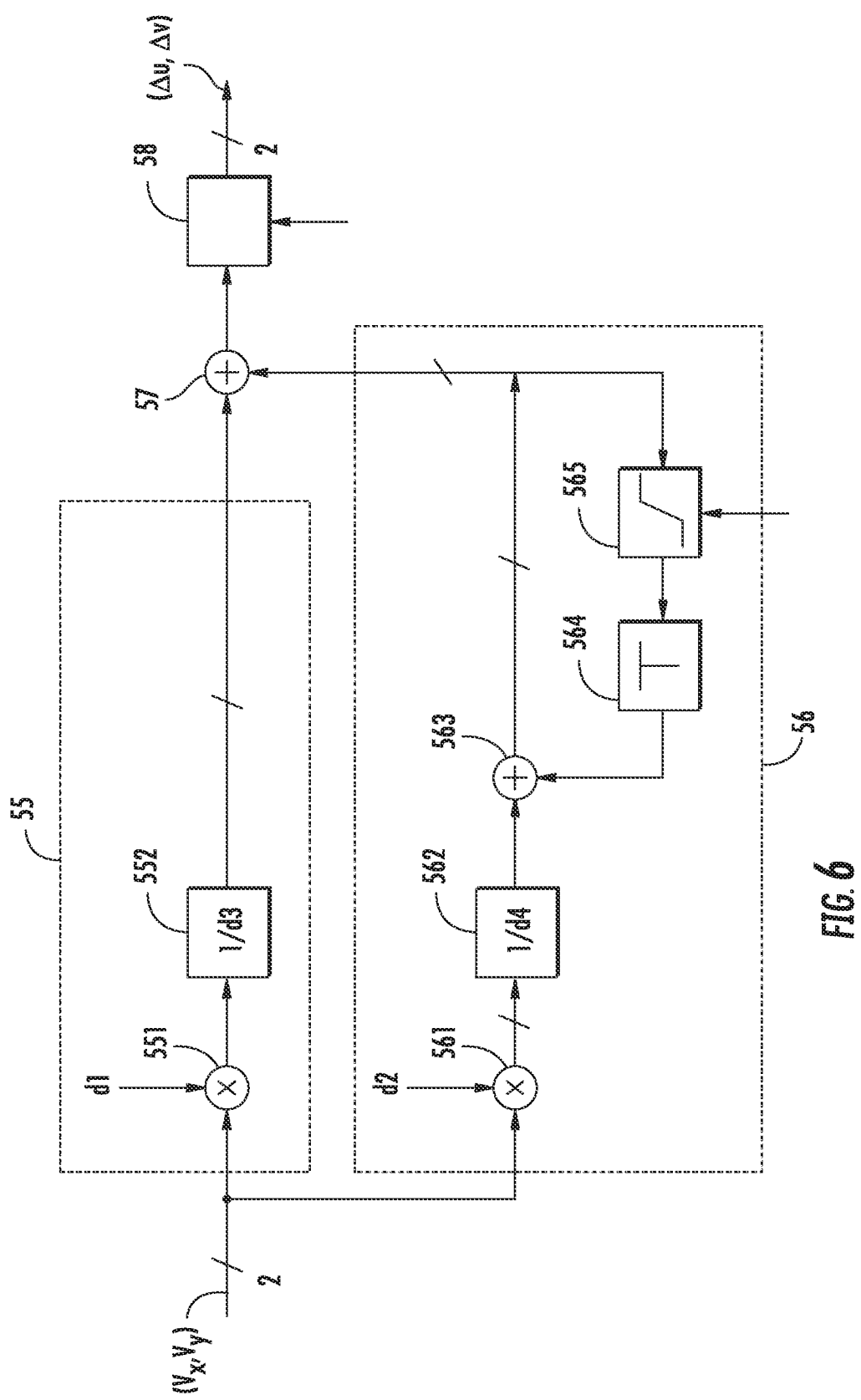
FIG. 6 illustrates an example of the filter in detail.

FIG. 6 shows a possible embodiment of the second filter 54. This second filter 54 contains a proportional filter 55 and an integral filter 56 which are connected in parallel and the filter output values of which are added together by an adder 57. Provided at the output of this adder 57 is the offset information ($\Delta u$, $\Delta v$). An option is to connect a limiter 58 downstream of this adder 57, which limits the output signal of the adder 57 to positive values or to negative values. It should be noted that both filters in each case naturally have two processing branches, specifically a first processing branch for the horizontal component $\Delta u$ of the offset information, and a second processing branch for the vertical component $\Delta v$ of the offset information.

The proportional filter 55 comprises an amplifier 551 for amplifying the first motion information (vx, vy) and a first amplification factor d1. The integral filter 56 has an amplifier 561 which multiplies the first motion information (vx, vy) with a second amplification factor d2. The output signal of this amplifier 561 is fed to an adder 563 which adds the output signal of this adder to an output signal of the adder 563 delayed by a delay member 564, resulting in integration with the first motion information Vx, Vy. The output signal of the adder 563 of the integral filter forms the output signal of this integral filter, which is fed to the adder 57.

The advantage of providing a second filter 54 with PI performance is that via the selection circuit 52 only motion vectors of an individual previously determined motion vector field must be selected, that motion information resulting from motion vector fields flows into the calculating of the offset ($\Delta u$, $\Delta v$) which was calculated further in the past, as determined however by the integral performance of the second filter 54. Finally, it should be pointed out that motion vectors of a motion vector field resulting from test vectors tested in the previously explained manner are to be corrected by an offset value which corresponds to the offset between the image sections S, S' during testing of the vectors. Such an offset is not to be considered if the motion vectors are used for pixel interpolation and if the buffer memory 31, 32 is to be accessed directly during pixel interpolation, as illustrated in FIG. 4.

In the arrangement illustrated in FIG. 4 the addressing circuit 50 is part of a loop which serves to set the offset based on previously determined motion information. This offset can be recalculated every time a motion vector field is redetermined in the test circuit for an original image or for an intermediate image. In determining the offset in this case motion information flows in from all motion vector fields.

In another example, provision is made in determining the offset to consider only those motion vector fields or respectively information only from such motion vector fields which were determined for original images of the image sequence. Only motion vectors of those motion vector fields determined for original images are forwarded to the addressing unit from the vector memory, in this case. This is the same as the loop with the addressing unit 50 being interrupted during such periods, whereas the motion vector fields are determined for intermediate images. With this method an offset most recently determined for an original image for the intermediate images is retained, until such time as a new offset is calculated by means of the vector field for the next original image. The data to be read into the buffer memory 31, 32 allowing for the offset are selected also using this method considering the equations 4a and 4b. The loop can be interrupted by a switch 60 which is illustrated schematically in FIG. 4 (in dashed lines) and controlled by the control circuit 100.

In another example it is provided to ascertain an offset based on such motion information only, which is represented by vector fields for original images, not to utilize this offset in determining motion vector fields for intermediate images or only to utilize it reduced, if the motion vector field or the motion vector fields fulfills a preset offset modification criterion by means of which the offset was determined. Such a criterion is given for example whenever the average value of the motion vectors of this vector field is over a given value, or whenever there is strong inhomogeneity of the vector field. Such strong inhomogeneity is present for example whenever the values of individual vectors of the vector field deviate sharply from an average value.

Figure 7:
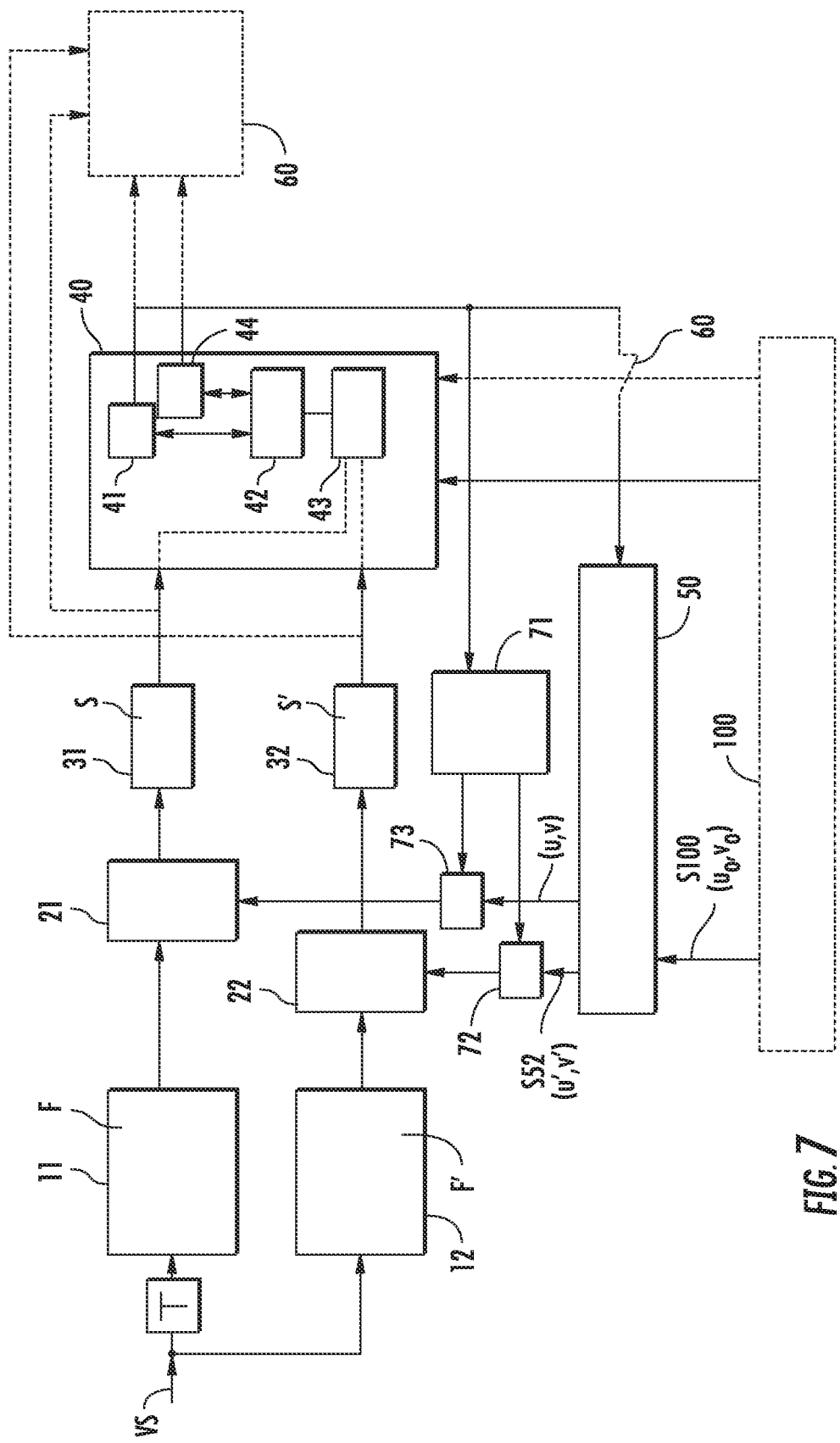
FIG. 7 illustrates a further example of a device for testing a motion vector which has an addressing circuit.

FIG. 7 illustrates an arrangement with such functionality, which differs from the arrangement illustrated in FIG. 4 in that an evaluation circuit 71 is present which accesses the vector memory 41 and which is designed to evaluate the motion vector fields, determined for original images, to the extent where the offset modification criterion is fulfilled. The evaluation circuit 71 is also designed to modify or reset to zero the offset information produced by the addressing unit 50, if the offset modification criterion is fulfilled. Connected in between the addressing unit 50 and the read and write circuits are offset modification circuits 72, 73 which are configured controlled by the evaluation circuit 71 to set to zero the offset for determining vector fields created by the addressing circuit 50 for intermediate images or at least to reduce it by a preset factor.

If the motion vector fields for intermediate images are determined with another offset as motion vector fields for the original images, then the motion vector fields for an original image and the motion vector fields for the subsequent intermediate images differ. For this reason the arrangement illustrated in FIG. 7 has two motion vector memories: a first vector memory 41 for the vector fields of original images, accessed by the evaluation circuit 71; and a second vector memory 44 for the vector fields of intermediate images. For creating test vectors for the original images the test vector unit 42 accesses the first vector memory 41 in which the vector field is stored for at least one preceding original image, and for creating test vectors for the intermediate images accesses the second vector memory 44 in which the vector field is stored for at least one preceding intermediate image.

The interpolator 60 can be fundamentally configured to also interpolate images at original image positions, therefore images with an interpolation phase α=0 or α=1 or to directly use the original images present in the image sequence for these original image positions. In the first case the interpolator receives a motion vector field for all images, and in the second case only for the intermediate images.

Providing offset between the image sections, which are saved in the memories 31, 32 for the purposes of motion estimation, increases the estimation area insofar as longer vectors can be tested than would be the case without offset, depending on the offset.

Alternatively or in addition to providing offset there is also the possibility of increasing the estimation area by the image sections stored in the memories being undersampled or being scaled down prior to saving. A large image section can be saved in a buffer memory of given size. This undersampling or this scaling down results in information loss, which can be tolerable in moderate scaling factors such as e.g. scaling factors between 0.25 and 0.5 for motion estimation. Any scaling units (not illustrated) which are connected in between the memory 11, 12 and the buffer memory 31, 32 can be provided for scaling down. Scaling can occur in the horizontal and vertical direction of the image sections to be saved similarly in the intermediate memories, i.e. with the same horizontal and vertical scaling factors. The horizontal and vertical scaling factor can also differ, however. It can be provided in an example to save only every second line of the image sections in the intermediate memories 31, 32. A scaling factor of 0.5 is obtained in the vertical direction and a scaling factor of 1 is obtained in the horizontal direction.

In another example it is provided for two image sections of an image to be stored in each of the buffer memories 31, 32 such that a first image section in the first memory has a first offset relative to a first image section in the second memory and in that a second image section in the second memory has a second offset relative to a second image section in the second memory, whereby the first and the second offset are different. With this method two different offsets can be "tested" at the same time, or respectively motion estimations with different offsets can be conducted at the same time, likewise leading to enlargement of the estimation area. In an example provision is made to carry out motion estimation with an offset equaling zero at the same time as the previously explained motion estimation with an offset not equal to zero. The different image sections to be saved in a buffer memory can be scaled down, whereby no enlargement of the memory capacity of the buffer memory 31, 32 is required, despite the attained enlargement of the estimation area.

In connection with scaling down of the image sections to be saved it should still be noted that a motion vector, determined using image sections which were scaled down, must be scaled up accordingly. If the scaling factor is for example a, then the determined vector is to be multiplied by the reciprocal value 1/a or respectively scaled whenever the vector is to be used for example for image interpolation based on non-scaled image data.

Figure 8:
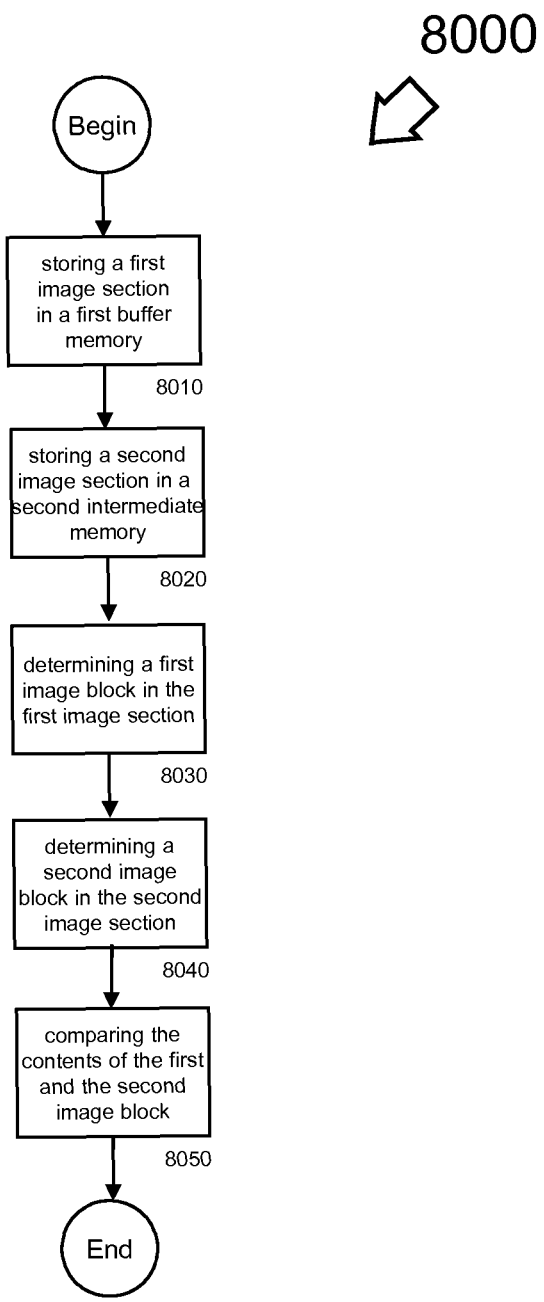
FIG. 8 illustrates a flow charts a method embodiment.

FIG. 8 illustrates a flow charts a method 8000, constructed in accordance with an embodiment of the present disclosure. At 8010, a first image section of a first image of the image sequence is stored in a first buffer memory. A second image section of a second image of the image sequence is stored in a second intermediate memory, 8020. A position of the first image section in the first image and a position of the second image section in the second image have a reciprocal offset which is dependent on the at least one item of motion information. At 8030, a first image block in the first image section is determined using the motion vector. At 8040 a second image block in a second image section using the motion vector. The contents of the first and of the second image blocks are determined, 8050.

The invention claimed is:

1. In a device for testing a motion vector which has at least one item of motion information assigned to an image sequence, a method comprising:
    storing a first image section of a first image of the image sequence in a first buffer memory;
    storing a second image section of a second image of the image sequence in a second intermediate memory, a position of the first image section in the first image and a position of the second image section in the second image having a reciprocal offset which is dependent on the at least one item of motion information;
    determining a first image block in the first image section and a second image block in the second image section using the motion vector; and comparing the contents of the first and of the second image blocks.

2. The method as claimed in claim 1, wherein determining the motion information comprises:
    ascertaining a motion vector field with several motion vectors which are assigned an image of the image sequence; and
    determining the motion information depending on at least one motion vector of the motion vector field.

3. The method as claimed in claim 2, wherein the determining the motion information further comprises:
    filtering several motion vectors of the motion vector field to ascertain a filter value; and selecting the filter value as motion information.

4. The method as claimed in claim 2, wherein the motion information corresponds to an average value of several motion vectors of the motion vector field.

5. The method as claimed in claim 2, wherein the motion information corresponds to an average value of all motion vectors of the motion vector field.

6. The method as claimed in claim 2, wherein the motion information is represented by a shortest motion vector of the motion vector field.

7. The method as claimed in claim 2, wherein the motion information is represented by a longest motion vector of the motion vector field.

8. The method as claimed in claim 2, wherein the motion vector to be tested is part of a second motion vector field and wherein the motion information depends on the motion vector located in the first motion vector field at the same position as the motion vector to be tested or depends on motion vectors located in the first motion vector field adjacent to the position of the motion vector to be tested.

9. The method as claimed in claim 1, further comprising assigning an interpolation phase to the motion vector, wherein a position of the first and second image section inside the first and second image is dependent on the interpolation phase.

10. The method as claimed in claim 9, wherein the motion vector is part of a motion vector field, wherein the first and second image section are shifted relative to a basic position, wherein the basic position is dependent on the position of the motion vector within the motion vector field and wherein a shift of the first and second image section relative to the basic position is dependent on the interpolation phase.

11. The method as claimed in claim 10, wherein a position (u1, v1) of the first image section in the first image equals $(u_0-(1-\alpha)\cdot\Delta u, v_0-\alpha\cdot\Delta v)$ and wherein a position of the second image section (u2, v2) in the second image equals $(u_0-(1-\alpha)\cdot\Delta u, v_0-(1-\alpha)\cdot\Delta v)$, wherein:

$\alpha$ designates the interpolation phase, $u_0$ designates a first position component of the basic position, $v_0$ designates a second position component of the basic position, $\Delta u$ designates a first component of the offset, and $\Delta v$ designates a second component of the offset.

12. The method as claimed in claim 10, wherein the motion vector field comprises motion vectors to which the image blocks of an intermediate image to be interpolated are assigned.

13. The method as claimed in claim 12, wherein the basic position is dependent on the position of an image block to be interpolated in the block grid to which the motion vector to be tested is assigned.

14. The method as claimed in claim 13, wherein the basic position is selected such that the image block is located at least approximately in the center of the image section if the offset is zero.

15. The method as claimed in claim 1, further comprising testing a first motion vector and a second motion vector, wherein the first and second image section have a first offset for testing the first motion vector and have a second offset for testing the second motion vector.

16. The method as claimed in claim 2, further comprising determining motion vector fields for original images of the image sequence and for intermediate images to be interpolated, wherein the offset is dependent on only at least one vector field, which was determined for an original image.

17. The method as claimed in claim 16, wherein the offset is reduced or set to zero in determining motion vector fields for intermediate images.

* * * * *